(12) United States Patent
Ginder

(10) Patent No.: US 8,899,258 B2
(45) Date of Patent: Dec. 2, 2014

(54) DRAIN VALVE AND METHOD FOR OPERATING A DRAIN VALVE

(75) Inventor: William F. Ginder, Salem, VA (US)

(73) Assignee: Graham-White Manufacturing Company, Salem, VA (US)

( * ) Notice: Subject to any disclaimer, the term of this patent is extended or adjusted under 35 U.S.C. 154(b) by 621 days.

(21) Appl. No.: 13/234,606

(22) Filed: Sep. 16, 2011

(65) Prior Publication Data

US 2013/0068306 A1 Mar. 21, 2013

(51) Int. Cl.
*F16K 21/10* (2006.01)
*F16T 1/14* (2006.01)
*F16T 1/16* (2006.01)
*F16K 1/00* (2006.01)

(52) U.S. Cl.
CPC ........................................ *F16K 1/00* (2013.01)
USPC ........ 137/183; 137/182; 137/461; 137/467.5; 137/495; 137/505.13; 137/505.18; 251/20

(58) Field of Classification Search
CPC .............. F16T 1/14; F16T 1/16; F16K 21/10; B01D 5/009; G05D 7/0126
USPC ......... 137/183, 182, 177, 217, 218, 456, 461, 137/467.5, 495, 505.13, 505.18; 251/15, 20
See application file for complete search history.

(56) References Cited

U.S. PATENT DOCUMENTS

| | | | |
|---|---|---|---|
| 2,549,909 A * | 4/1951 | Joynes | ............................ 251/50 |
| 3,262,464 A | 7/1966 | Frantz | |
| 3,949,964 A | 4/1976 | Freeman | |
| 4,336,821 A | 6/1982 | Frantz et al. | |
| 4,603,832 A | 8/1986 | Sjoquist | |
| 6,024,114 A | 2/2000 | Thomas | |
| 6,109,289 A | 8/2000 | Firth | |

OTHER PUBLICATIONS

Search Report and Written Opinion for Application No. PCT/US2012/053718 dated Jan. 21, 2013.

* cited by examiner

*Primary Examiner* — Craig Schneider
(74) *Attorney, Agent, or Firm* — Dority & Manning, P.A.

(57) ABSTRACT

A drain valve includes an inlet plenum, a first orifice downstream from the inlet plenum, a second orifice downstream from the first orifice, and a fluid passage between the first and second orifices. A piston having a first position and a second position has a first surface area exposed to the fluid passage when the piston is in the first and second positions and a second surface area exposed to the inlet plenum when the piston is in the second position.

16 Claims, 4 Drawing Sheets

DRAIN VALVE AND METHOD FOR OPERATING A DRAIN VALVE

FIELD OF THE INVENTION

The present invention generally involves a drain valve and a method for operating the drain valve. In particular embodiments of the present invention, the drain valve and method may operate to remove fluids from a pressurized system.

BACKGROUND OF THE INVENTION

Pressurized systems, such as those commonly used in locomotive and/or railcar brake systems, often generate various contaminants and condensation that may adversely affect the efficiency and function of the systems if not removed. For example, contaminants and condensation in a pressurized air system may corrode or clog sensor lines and/or damage air operated equipment. A drain valve may therefore be connected to the pressurized system to expel the contaminants and condensates. In many cases, the drain valve may be designed for local and/or remote operation so that contaminants and condensation may be drained at specific intervals or as needed.

U.S. Pat. Nos. 3,262,464 and 4,336,821, assigned to the same assignee as the present invention, describe a suitable drain valve for use in pressurized air systems used with locomotive brakes. However, routine and/or improper operation of the drain valve may result in excessive wear and/or damage to the pressurized system and/or drain valve if not corrected. For example, the drain valve may be routinely operated at regular intervals that do not accurately reflect the accumulation of contaminants or condensation in the pressurized system. Operating the drain valve too often results in excessive discharges from the pressurized system that increase wear to the pressurized system and/or the drain valve. Conversely, operating the drain valve too infrequently results in an excessive buildup of contaminants and condensation that may corrode or damage the pressurized system. The drain valve may also be inadvertently aligned to continuously drain fluid from the pressurized system, again increasing wear to the pressurized system and/or drain valve and/or possibly causing a loss of pressure in the pressurized system.

Therefore, an improved drain valve and method for operating the drain valve that reliably removes fluids from the pressurized system would be useful.

BRIEF DESCRIPTION OF THE INVENTION

Aspects and advantages of the invention are set forth below in the following description, or may be obvious from the description, or may be learned through practice of the invention.

One embodiment of the present invention is a drain valve that includes an inlet plenum, a first orifice downstream from the inlet plenum, a second orifice downstream from the first orifice, and a fluid passage between the first and second orifices. A piston having a first position and a second position has a first surface area exposed to the fluid passage when the piston is in the first and second positions and a second surface area exposed to the inlet plenum when the piston is in the second position.

Another embodiment of the present invention is a drain valve that includes an inlet plenum and a fluid passage downstream from the inlet plenum, wherein the fluid passage includes an inlet port and an outlet port. A piston has a first position that prevents fluid flow through the fluid passage and a second position that allows fluid flow through the fluid passage. A first surface area on the piston is exposed to the fluid passage when the piston is in the first and second positions, and a second surface area on the piston is exposed to the inlet plenum when the piston is in the second position.

The present invention may also include a method for operating a drain valve that includes applying a system pressure to an inlet plenum and creating a fluid pressure in a fluid passage downstream from the inlet plenum, wherein the fluid passage is between a first orifice and a second orifice. The method further includes applying the fluid pressure to a first surface area of a piston to produce a first force across the first surface area of the piston, moving the piston from a first position that prevents fluid flow through the fluid passage to a second position that allows fluid flow through the fluid passage, and applying the system pressure to a second surface area of the piston when the piston is in the second position to produce a second force across the second surface area of the piston. The method further includes moving the piston from the second position to the first position when the first force across the first surface area of the piston exceeds the second force across the second surface area of the piston.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
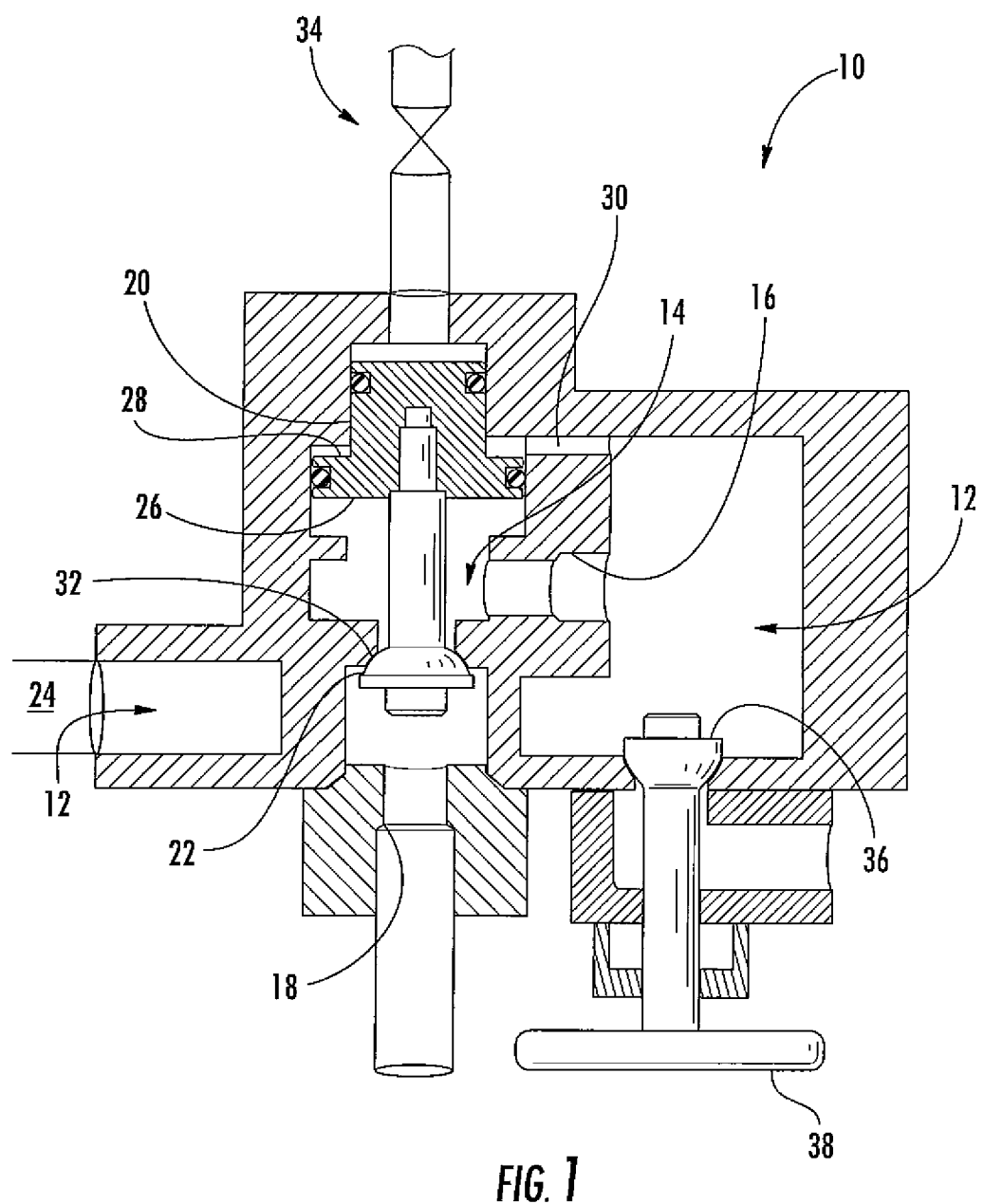
FIG. 1 is a cross-section view of a drain valve according to one embodiment of the present invention in the shut position.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify position, location, or importance of the individual components unless specifically stated in the claims.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention provide a drain valve and method for operating the drain valve. The drain valve may be connected to a pressurized system and locally and/or remotely operated to permit fluid flow through the drain valve and out of the pressurized system. As used herein, the term "fluid" includes both liquid fluids and gaseous fluids. In particular embodiments, the drain valve utilizes principles associated with Darcy's Law to maintain liquid fluid flow through the drain valve and to automatically reposition the drain valve when substantially all of the liquid fluids have been expelled from the pressurized system. Although exemplary embodiments of the present invention may be described in the context of air systems for purposes of illustration, one of ordinary skill in the art will readily appreciate that embodiments of the present invention may be applied to any pressurized system to expel liquids, and the present invention is not limited to any particular pressurized system unless specifically recited in the claims.

Figure 2:
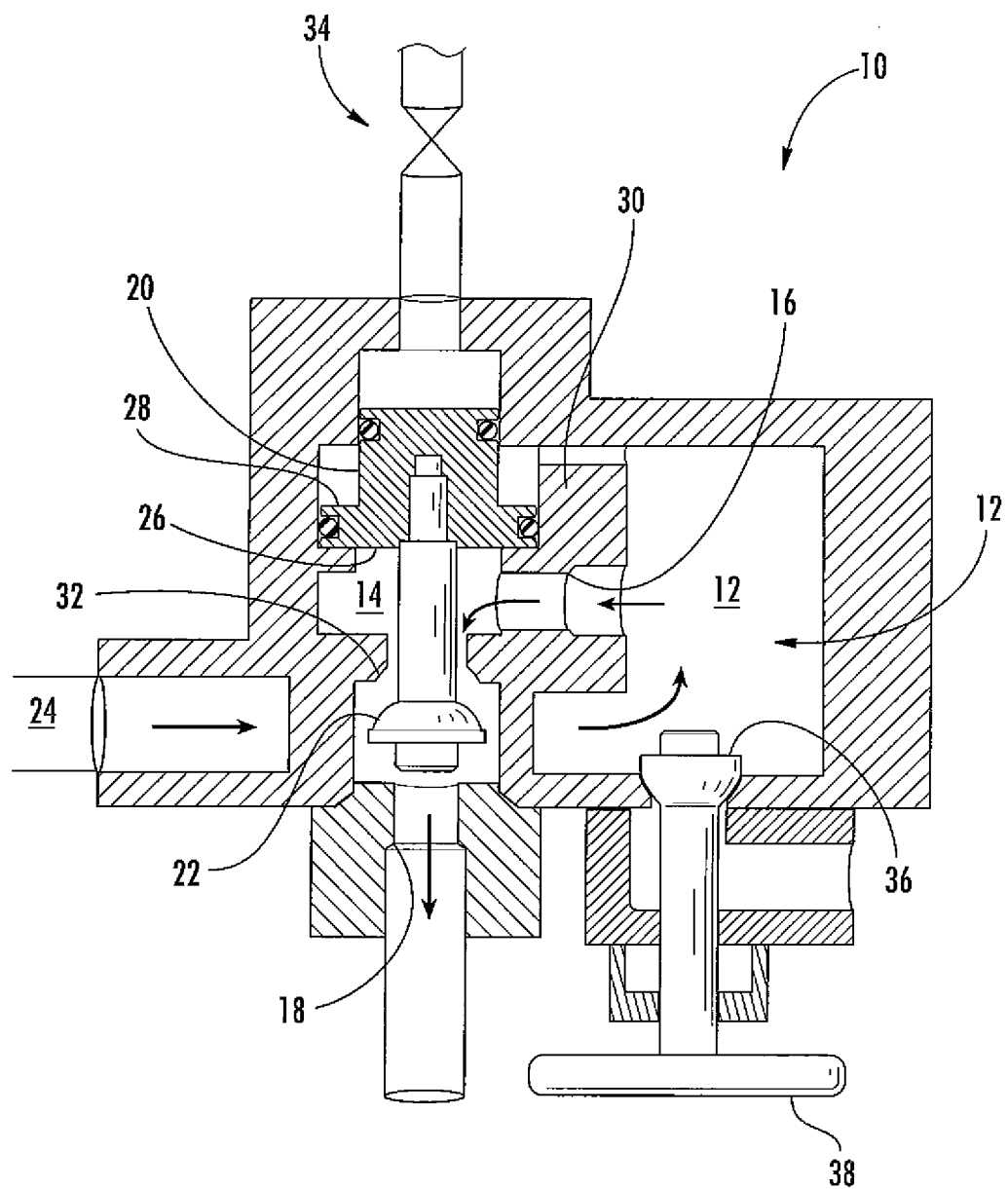
FIG. 2 is a cross-section view of the drain valve shown in FIG. 1 in the open position.

FIGS. 1 and 2 provide cross-section views of a drain valve 10 according to one embodiment of the present invention in shut and open positions, respectively. As shown, the drain valve 10 may generally include an inlet plenum 12, a fluid passage 14 between two orifices 16, 18, and a piston 20 engaged with a poppet 22 to alternately prevent or permit fluid flow through the valve 10 based on a differential force across the piston 20. Specifically, the piston 20 may be locally and/or remotely positioned from a first position that prevents fluid flow through the valve 10 (as shown in FIG. 1) to a second position that permits fluid flow through the inlet plenum 12 and fluid passage 14 and across the poppet 22 (as shown in FIG. 2). As long as the fluid flow predominantly includes generally non-compressible liquid fluids, such as contaminants or condensation, the differential force across the piston 20 holds the piston 20 in the second position to continue to permit liquid fluids to flow through the valve 10. However, when the generally non-compressible liquid fluids have been completely expelled and the fluid flow is predominantly gaseous fluids, the differential force across the piston 20 automatically repositions the piston 20 to the first position to prevent additional gaseous fluids from flowing through the valve 10.

The inlet plenum 12 connects the drain valve 10 to a pressurized system 24, preferably but necessarily at a location where contaminants and condensation are likely to collect in the pressurized system 24. For example, the inlet plenum 12 may connect to one or more low points in the pressurized system 24 where gravity will naturally cause contaminants and condensation to collect. As shown in FIGS. 1 and 2, the fluid passage 14 may be downstream from the inlet plenum 12 and separated from the inlet plenum 12 by the first orifice 16. The second orifice 18 may be downstream from the first orifice 16 so that the first orifice 16 effectively functions as an inlet port 16 to the fluid passage 14, and the second orifice 18 effectively functions as an outlet port 18 to the fluid passage 14.

The piston 20 is generally engaged with or connected to the poppet 22 to move the poppet 22 between the first position in which the drain valve 10 is shut (FIG. 1) and the second position in which the drain valve 10 is open (FIG. 2). The piston 20 has a first surface area 26 and a smaller second surface area 28 generally opposed to the first surface area 26. As shown in FIGS. 1 and 2, the first surface area 26 is continuously exposed to the fluid passage 14 and associated pressure in the fluid passage 14 when the piston 20 is in either the first or second positions. In contrast, the second surface area 28 is isolated or shielded from the inlet plenum 12 and associated pressure in the inlet plenum 12 when the piston 20 is in the first position as shown in FIG. 1. However, a port 30 provides fluid communication between the inlet plenum 12 and the second surface area 28 when the piston 20 is in the second position, exposing the second surface area 28 to the inlet plenum 12 and associated pressure in the inlet plenum 12 when the piston 20 is in the second position as shown in FIG. 2.

The poppet 22 may be located at any position in or downstream from the inlet plenum 12. For example, as shown in FIGS. 1 and 2, the poppet 22 may be located in the fluid passage 14 to alternately prevent or permit fluid flow through the valve 10. Specifically, as shown in FIG. 1, the poppet 22 may be engaged with or connected to the piston 20, and the piston 20 may position the poppet 22 against a seat 32 to prevent fluid flow through the inlet plenum 12 and fluid passage 14 and across the poppet 22. Alternately, as shown in FIG. 2, the piston 20 may move the poppet 22 away from the seat 32 to permit fluid flow through the inlet plenum 12 and fluid passage 14 and across the poppet 22. Although shown as a reversed seated poppet 22 in the fluid passage 14, one of ordinary skill in the art will readily appreciate that the particular seating arrangement or location of the poppet 22 is not a limitation of the present invention unless specifically recited in the claims.

Figure 3:
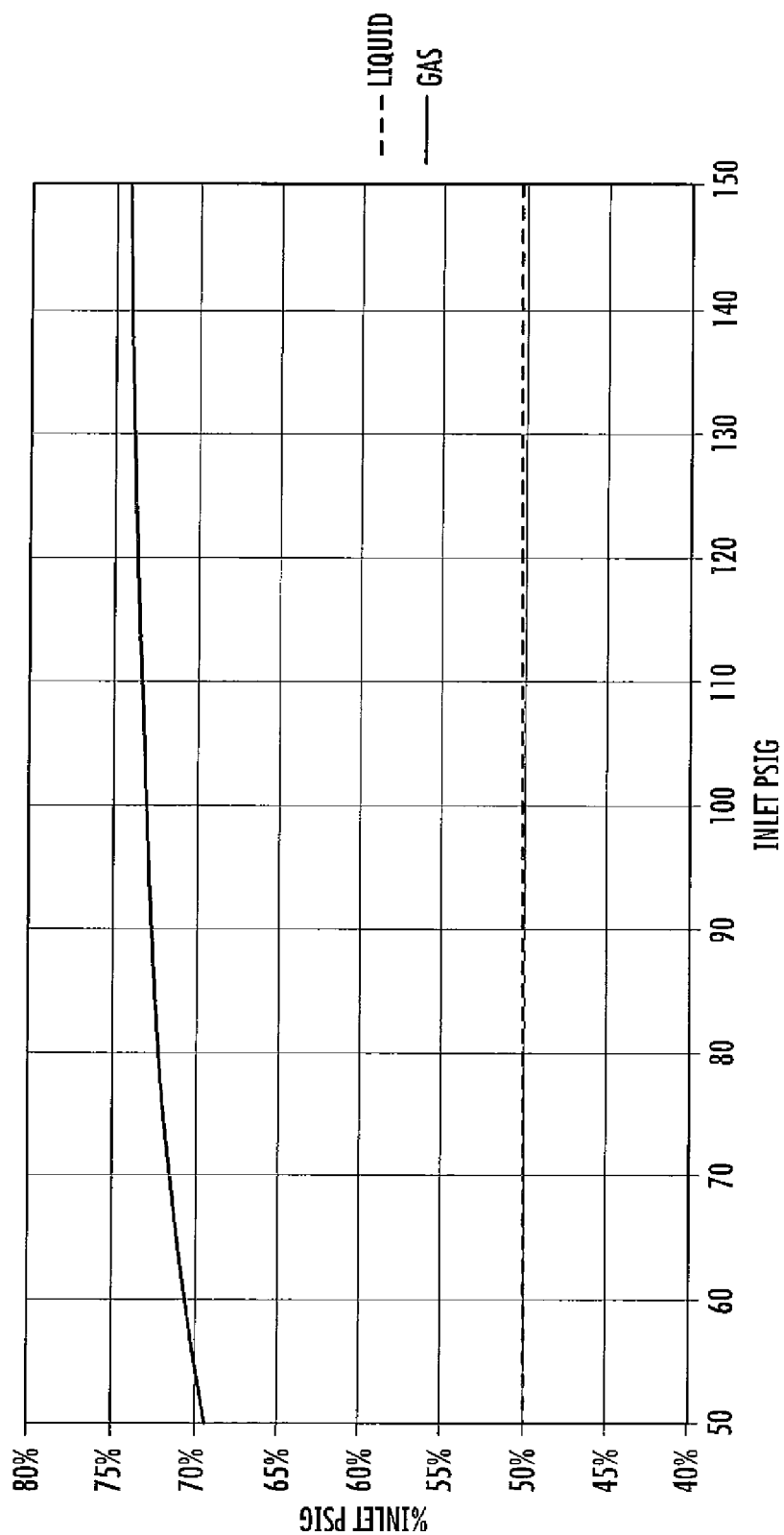
FIG. 3 is an exemplary graph of the pressure of a non-compressible liquid and a compressible gas flowing between two equally sized orifices.

FIG. 3 provides exemplary graphs of the pressure of a non-compressible liquid and a compressible gas flowing between two equally sized orifices to illustrate empirical principles of Darcy's Law utilized by the drain valve 10. As shown in FIG. 3, the pressure of a non-compressible liquid flowing between two equally sized orifices is approximately 50% of the inlet pressure of the liquid. Similarly, the pressure of a compressible gas flowing between two equally sized orifices is between approximately 69% and 74% of the inlet pressure of the gas, depending on the inlet pressure of the gas.

The empirical principles of Darcy's Law illustrated in FIG. 3 may thus be applied to explain the operation of the drain valve 10 shown in FIGS. 1 and 2. Beginning with the piston 20 in the first position, as shown in FIG. 1, the piston 20 holds the poppet 22 against the seat 32 to prevent any fluid flow through the drain valve 10. With no fluid flow through the drain valve 10, the pressure supplied by the pressurized system 24 builds up and equalizes across the first orifice 16 so that the pressure in the inlet plenum 12 is equal to the pressure in the fluid passage 14. The pressure in the fluid passage 14 is applied against the first surface area 26 of the piston 20 to hold the piston 20 in the first position, and the drain valve 10 remains shut.

In FIG. 2, the piston 20 has been repositioned to the second position by any means for moving the piston 20 from the first position to the second position. The means may include any remote, local, manual, or automatic device capable of repositioning the piston 20 in the drain valve 10. For example, the means may include a solenoid or other suitable magnetic coupling connected to the piston 20 to move the piston 20 in the drain valve 10. Alternately or in addition, the means may include a manual hand wheel, a threaded connection, or other suitable mechanical device engaged with the piston 20. In still further embodiments, as shown in FIGS. 1 and 2, the means may include a pneumatic or hydraulic supply 34 that alternately supplies or relieves pressure to reposition the piston 20 in the drain valve 10. The means for moving the piston 20 may be actuated periodically or when desired to open the drain valve 10 to expel liquid fluids from the pressurized system 24.

With the piston 20 in the second position shown in FIG. 2, the piston 20 has separated the poppet 22 from the seat 32 to permit fluid flow through the inlet plenum 12 and fluid passage 14 and across the poppet 22. The pressure in the fluid passage 14 continues to be applied to the first surface area 26 of the piston 20. In addition, the pressure in the inlet plenum 12 is applied through the port 30 to the second surface area 28.

As the fluid flows through the fluid passage 14, the principles of Darcy's Law, the size of the first and second orifices 16, 18, and size of the first and second surface areas 26, 28 determine the differential force across the piston 20, and thus the position of the drain valve 10. Specifically, the differential force across the piston 20 may be calculated as follows:

$$(P_{fluid\ passage} \times A_{First\ Surface\ Area}) - (P_{inlet\ plenum} \times A_{Second\ Surface\ Area})$$

In one particular embodiment, for example, the first and second orifices 16, 18 may be the same size, and the first surface area 26 may be approximately 50% larger than the second surface area 28. As long as the fluid flow through the fluid passage 14 is predominantly non-compressible liquid fluids, then the pressure in the fluid passage 14 will be approximately 50% of the pressure in the inlet plenum 12, as shown in FIG. 3. As a result, the force applied to the first surface area 26 (i.e., $P_{fluid\ passage} \times A_{First\ Surface\ Area}$) will be approximately 75% of the force applied to the second surface area 28 (i.e., $P_{inlet\ plenum} \times A_{Second\ Surface\ Area}$), and the differential force across the piston 20 will hold the piston 20 in the second position to permit liquid fluids to continue to flow through the drain valve 10 and out of the pressurized system 24. As the generally non-compressible liquid fluids are expelled from the pressurized system 24 and the fluid flow becomes predominantly gaseous fluids, the pressure in the fluid passage 14 will increase to more than 70% of the pressure in the inlet plenum 12, as shown in FIG. 3. As a result, the force applied to the first surface area 26 will exceed the force applied to the second surface area 28, and the differential force across the piston 20 will reposition the piston 20 to the first position to prevent additional gaseous fluids from flowing through the drain valve 10 and out of the pressurized system 24. Although the first and second orifices 16, 18 were the same size in the preceding example, one of ordinary skill in the art will readily appreciate that alternate embodiments within the scope of the present invention may have different sized first and second orifices 16, 18, with corresponding adjustments made to the sizes of the first and second surface areas 26, 28 to produce the desired differential force across the piston 20.

Figure 4:
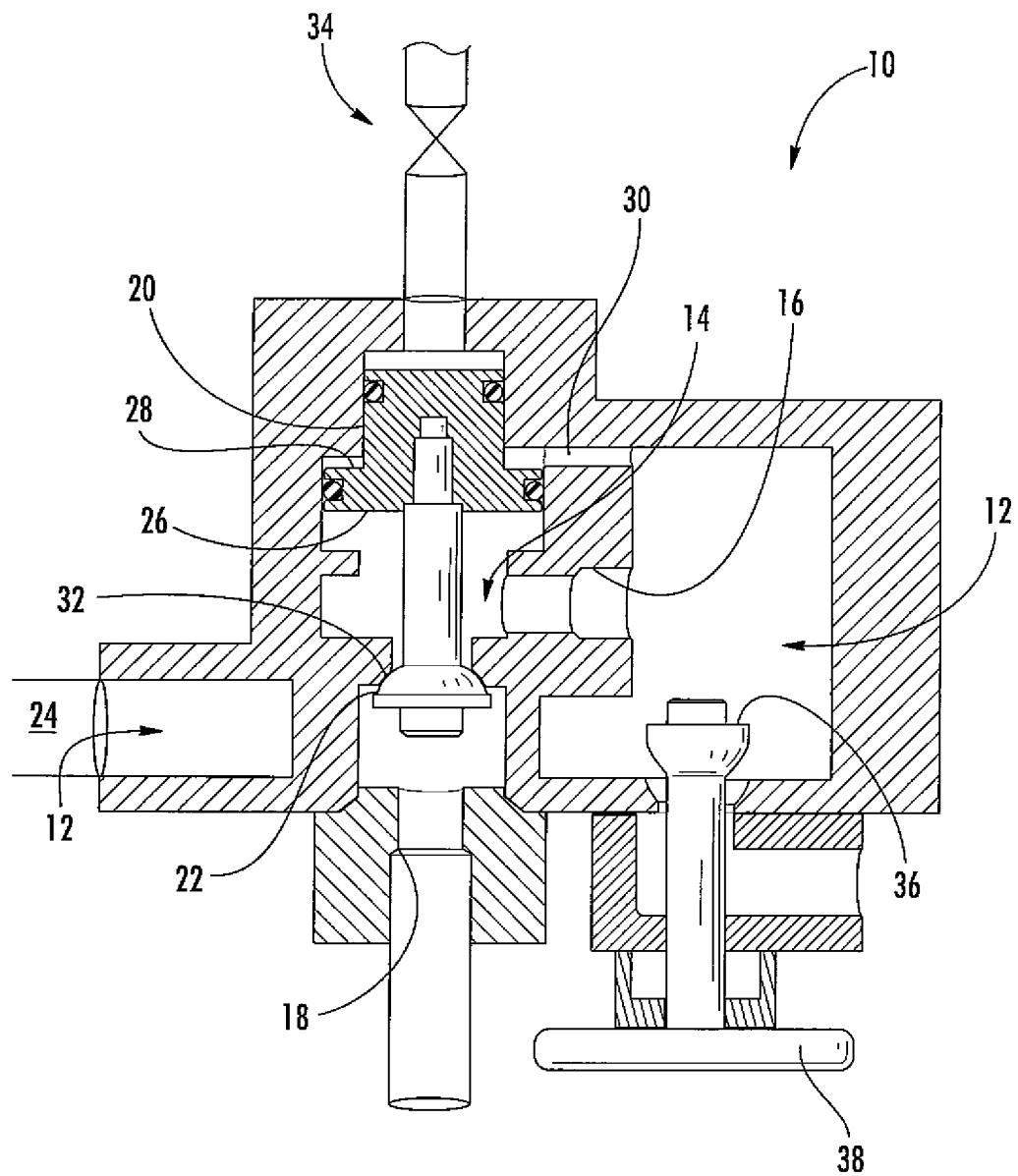
FIG. 4 is a cross-section view of the drain valve shown in FIG. 1 in a manual by-pass position.

FIG. 4 provides a cross-section view of the drain valve 10 shown in FIG. 1 in a manual by-pass position. As shown, the drain valve 10 may further include a bypass poppet 36 in the inlet plenum 12. The bypass poppet 36 may be connected to a manual or automated hand wheel 38 that repositions the bypass poppet 36. Specifically, the hand wheel 38 may be rotated to reposition the bypass poppet from a first position that prevents fluid flow across the bypass poppet 36, as shown in FIGS. 1 and 2, to a second position that allows fluid flow across the bypass poppet 36, as shown in FIG. 4. In this manner, the bypass poppet 36 allows the drain valve 10 to be bypassed, for example, to facilitate more rapid flow out of the pressurized system 24.

As previously described with respect to FIGS. 1, 2, and 3, the present invention also includes a method for operating the drain valve 10. The method includes applying a system pressure to the inlet plenum 12 and creating a fluid pressure in the fluid passage 14 downstream from the inlet plenum 12, wherein the fluid passage 14 is between the first orifice 16 and the second orifice 18. The method further includes applying the fluid pressure to the first surface area 26 of the piston 20 to produce a first force across the first surface area 26 of the piston 20, moving the piston from the first position that prevents fluid flow through the fluid passage 14 to the second position that allows fluid flow through the fluid passage 14, and applying the system pressure to the second surface area 28 of the piston 20 when the piston 20 is in the second position to produce a second force across the second surface area 28 of the piston 20. The method also includes moving the piston 20 from the second position to the first position when the first force across the first surface area 26 of the piston 20 exceeds the second force across the second surface area 28 of the piston 20.

In particular embodiments, the method may also include flowing a substantially non-compressible fluid through the fluid passage 14, flowing a gaseous fluid through the fluid passage 14, and/or isolating the system pressure from the second surface area 28 of the piston 20 when the piston 20 is in the first position.

The various embodiments of the present invention provide one or more benefits over existing devices. For example, the differential force across the piston 20 automatically shuts the drain valve 10 when the liquid fluids have been expelled from the pressurized system 24. As a result, the drain valve 10 does not have to be continually monitored during draining operations. Inasmuch as the drain valve 10 no longer requires monitoring during draining operations, the time required to perform the draining operations is less important, and the size of the first and second orifices 16, 18 may be reduced to limit the flow rate through the drain valve 10 to less than the pressurizing capacity of the pressurized system 24. As a result, the pressurized system 24 will not lose pressure even in the event that the drain valve 10 malfunctions and sticks in the open position.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A drain valve comprising:
   a. an inlet plenum;
   b. a first office downstream from the inlet plenum;
   c. a second orifice downstream from the first orifice;
   d. a fluid passage between the first and second orifices;
   e. a piston having a first position and a second position, wherein the piston has a first surface area exposed to the fluid passage when the piston is in the first and second positions and a second surface area exposed to the inlet plenum when the piston is in the second position and isolated from the inlet plenum when the piston is in the first position.

2. The drain valve as in claim 1, wherein the first orifice and the second orifice are the same size.

3. The drain valve as in claim 1, wherein the first surface area is at least 50% larger than the second surface area.

4. The drain valve as in claim 1, further comprising a poppet in the fluid passage engaged with the piston so that the first position of the piston prevents fluid flow through the fluid passage and the second position of the piston allows fluid flow through the fluid passage.

5. The drain valve as in claim 1, further comprising means for moving the piston from the first position to the second position.

6. The drain valve as in claim 1, further comprising a bypass poppet in the inlet plenum, wherein the bypass poppet has a first position that prevents fluid flow across the bypass poppet and a second position that allows fluid flow across the bypass poppet.

7. A drain valve comprising:
   a. an inlet plenum;
   b. a fluid passage downstream from the inlet plenum, wherein the fluid passage includes an inlet port and an outlet port;
   c. a piston engaged with a poppet in the fluid passage, wherein the piston has a first position that allows fluid flow through the fluid passage;
   d. a first surface area on the piston exposed to the fluid passage when the piston is in the first and second position;
   e. a second surface area on the piston exposed to the inlet plenum when the piston is in the second position and isolated from the inlet plenum when the piston is in the first position.

8. The drain valve as in claim 7, wherein the inlet port and the outlet port have the same cross-sectional area.

9. The drain valve as in claim 7, wherein the first surface area on the piston is at least 50% larger than the second surface area on the piston.

10. The drain valve as in claim 7, further comprising means for moving the piston from the first position to the second position.

11. The drain valve as in claim 7, further comprising a poppet engaged with the piston for preventing and allowing fluid flow through the fluid passage.

12. The drain valve as in claim 7, further comprising a bypass poppet in the inlet plenum, wherein the bypass poppet has a first position that prevents fluid flow across the bypass poppet and a second position that allows fluid flow across the bypass poppet.

13. A method for operating a drain valve, comprising:
   a. applying a system pressure to an inlet plenum;
   b. creating a fluid pressure in a fluid passage downstream from the inlet plenum, wherein the fluid passage is between a first orifice and a second orifice;
   c. applying the fluid pressure to a first surface area of a piston connected to a poppet to produce a first force across the first surface area of the piston;
   d. moving the piston from a first position that prevents fluid flow through the passage to a second position that allows fluid flow through the fluid passage;
   e. applying the system pressure to a second surface area of the piston when the piston is in the second position to produce a second force across the second surface area of the piston; and
   f. moving the piston from the second position to the first position when the first force across the first surface area of the piston exceeds the second force across the second surface area of the piston.

14. The method as in claim 13, further comprising flowing a substantially non-compressible fluid through the fluid passage.

15. The method as in claim 13, further comprising flowing a gas through the fluid passage.

16. The method as in claim 13, further comprising isolating the system pressure from the second surface area of the piston when the piston is in the first position.

* * * * *